US006066683A

United States Patent [19]

Beisner et al.

[11] Patent Number: 6,066,683

[45] **Date of Patent: *May 23, 2000**

[54] MOLDED AND SLAB POLYURETHANE FOAM PREPARED FROM DOUBLE METAL CYANIDE COMPLEX-CATALYZED POLYOXYALKYLENE POLYOLS AND POLYOLS SUITABLE FOR THE PREPARATION THEREOF

[75] Inventors: Robert W. Beisner, Charleston, W. Va.; Chiu Yan Chan, Wilmington; Thomas P. Farrell, Hockessin, both of Del.; Danny J. Frich, Cross Lanes, W. Va.; Mark R. Kinkelaar, Glenmoore, Pa.; Jack R. Reese, II, Cross Lanes; Donald F. Rohr, Winfield, both of W. Va.; Wolfgang Schmidt, West Chester, Pa.; Andrew M. Thompson, Hurricane, W. Va.

[73] Assignee: Lyondell Chemical Worldwide, Inc., Newton Square, Pa.

[ * ] Notice: This patent is subject to a terminal disclaimer.

[21] Appl. No.: 09/054,555

[22] Filed: Apr. 3, 1998

[51] Int. Cl.[7] ...................................................... C08G 18/48

[52] U.S. Cl. ............... 521/174; 252/182.24; 252/182.27; 252/182; 252/29; 521/170; 568/620; 568/624

[58] Field of Search .................................... 521/170, 174; 252/182.24, 182.27, 182.29; 568/620, 624

[56] References Cited

U.S. PATENT DOCUMENTS

| | | | |
|---|---|---|---|
| 4,472,560 | 9/1984 | Kuyper . | |
| 5,100,997 | 3/1992 | Reisch et al. . | |
| 5,158,922 | 10/1992 | Hinney et al. . | |
| 5,171,759 | 12/1992 | Hager . | |
| 5,470,813 | 11/1995 | Le-Khac . | |
| 5,482,908 | 1/1996 | Le-Khac . | |
| 5,545,601 | 8/1996 | Le-Khac . | |
| 5,811,829 | 9/1998 | Lawrey et al. ..................... | 252/182.24 |

FOREIGN PATENT DOCUMENTS

| | | |
|---|---|---|
| 0 677 543 A1 | 10/1995 | European Pat. Off. . |
| 2615927 | 6/1997 | Japan . |

*Primary Examiner*—John M. Cooney, Jr.
*Attorney, Agent, or Firm*—Brooks & Kushman P.C.

[57] ABSTRACT

Copolymer DMC-catalyzed polyoxypropylene polyols which exhibit processing latitude similar to base-catalyzed copolymer analogs and base-catalyzed homopolyoxypropylene analogs may be prepared by oxyalkylation with a mixture of propylene oxide and ethylene oxide such that a finite ethylene oxide content is maintained in the oxyalkylation reactor for the most substantial part of the oxyalkylation, the polyoxypropylene polyol having randomly distributed oxyethylene moieties which constitute 1.5 weight percent or more of the polyol product.

37 Claims, 1 Drawing Sheet

MOLDED AND SLAB POLYURETHANE FOAM PREPARED FROM DOUBLE METAL CYANIDE COMPLEX-CATALYZED POLYOXYALKYLENE POLYOLS AND POLYOLS SUITABLE FOR THE PREPARATION THEREOF

TECHNOLOGICAL FIELD

The present invention pertains to polyurethane molded and slab foam prepared from double metal cyanide complex-catalyzed polyether polyols exhibiting increased processing latitude. The present invention further pertains to polyoxyalkylene polyols prepared by the double metal cyanide complex (DMC) catalyzed polymerization of alkylene oxide mixtures to form polyoxypropylene polyether polyols having processing latitude suitable for use in preparing polyurethane molded and slab foam.

DESCRIPTION OF RELATED ART

Polyurethane polymers are prepared by reacting a di- or polyisocyanate with a polyfunctional, isocyanate-reactive compound, in particular, hydroxyl-functional polyether polyols. Numerous art-recognized classes of polyurethane polymers exist, for example cast elastomers, polyurethane RIM, microcellular elastomers, and polyurethane molded and slab foam. Each of these varieties of polyurethanes present unique problems in formulation and processing.

Two of the highest volume categories of polyurethane polymers are polyurethane molded and slab foam. In molded foam, the reactive ingredients are supplied to a closed mold and foamed, while in slab foam, the reactive ingredients are supplied onto a moving conveyor, or optionally into a discontinuous open mold, and allowed to rise freely. The resulting foam slab, often 6 to 8 feet (2 to 2.6 m) wide and high, may be sliced into thinner sections for use as seat cushions, carpet underlay, and other applications. Molded foam may be used for contoured foam parts, for example, cushions for automotive seating.

In the past, the polyoxypropylene polyether polyols useful for slab and molded foam applications have been prepared by the base-catalyzed oxypropylation of suitably hydric initiators such as propylene glycol, glycerine, sorbitol, etc., producing the respective polyoxypropylene diols, triols, and hexols. As is now well documented, a rearrangement of propylene oxide to allyl alcohol occurs during base-catalyzed oxypropylation. The monofunctional, unsaturated allyl alcohol bears an oxyalkylatable hydroxyl group, and its continued generation and oxypropylation produces increasingly large amount of unsaturated polyoxypropylene monols having a broad molecular weight distribution. As a result, the actual functionality of the polyether polyols produced is lowered significantly from the "nominal" or "theoretical" functionality. Moreover, the monol generation places a relatively low practical limit on the molecular weight obtainable. For example, a base catalyzed 4000 Da (Dalton) molecular weight (2000 Da equivalent weight) diol may have a measured unsaturation of 0.05 meq/g, and will thus contain 30 mol percent unsaturated polyoxypropylene monol species. The resulting actual functionality will be only 1.7 rather than the "nominal" functionality of 2 expected for a polyoxypropylene diol. As this problem is heightened as molecular weight increases, preparation of polyoxypropylene polyols having equivalent weights higher than about 2200–2300 Da is impractical using conventional base catalysis.

Many attempts have been made over the years to reduce the monol content of polyoxypropylene polyols. Use of lower temperatures and pressures results in some improvement, as illustrated by European published application EP 0 677 543 A1. However, monol content is only lowered to the range of 10–15 mol percent, and the reaction rate is decreased to such a degree that cost rises sharply due to increased reaction time. Use of alternative catalysts such as calcium naphthenate, optionally in conjunction with tertiary amine co-catalysts, result in polyols having levels of unsaturation of c.a. 0.02 to 0.04 meq/g, corresponding, again to 10–20 mol percent unsaturated monols.

Double metal cyanide catalysts such as zinc hexacyanocobaltate complexes were found to be catalysts for oxypropylation in the decade of the '60's. However, their high cost, coupled with modest activity and the difficulty of removing significant quantities of catalyst residues from the polyether product, prevented commercialization. Unsaturation of polyoxypropylene polyols produced by these catalysts was found to be low, however, at c.a. 0.018 meq/g. Improvements in catalytic activity and catalyst removal methods led to brief commercialization of DMC-catalyzed polyols in the 1980's. However, the economics were marginal at best, and the improvements expected due to the lower monol content and unsaturation did not materialize.

Recently, as indicated by U.S. Pat. Nos. 5,470,813, 5,482,908 and 5,545,601, researchers at the ARCO Chemical Company have produced DMC catalysts with exceptional activity, which have also resulted in lowering the unsaturation to unprecedented levels in the range of 0.002 to 0.007 meq/g. The polyoxypropylene polyols thus prepared were found to react in a quantitatively different manner from prior "low" unsaturation polyols in certain applications, notably cast elastomers and microcellular foams.

Despite their perceived advantages, substitution of such polyols for their base-catalyzed analogs in molded and slab foam formulations often led to catastrophic failure. In molded foams, for example, foam tightness increased to such an extent that the necessary crushing of the foams following molding proved difficult if not impossible. In both molded foams and slab foams, foam collapse often occurred, rendering such foams incapable of production. These effects occur even when the high actual functionality of such polyols is purposefully lowered by addition of lower functionality polyols to achieve an actual functionality similar to that of base-catalyzed polyols.

DMC-catalyzed polyoxypropylene polyols have exceptionally narrow molecular weight distribution, as can be seen from viewing gel permeation chromatograms of polyol samples. The molecular weight distribution is often far more narrow than analogous base-catalyzed polyols, particularly in the higher equivalent weight range. Polydispersities less than 1.5 are generally obtained, and polydispersities in the range of 1.05 to 1.15 are common. In view of the low levels of unsaturation and low polydispersity, it was surprising that DMC-catalyzed polyols did not prove to be "drop-in" replacements for base-catalyzed polyols in polyurethane foam applications. Because oxypropylation with modern DMC catalysts is highly efficient, it would be very desirable to provide DMC-catalyzed polyoxypropylene polyols which can directly replace conventional polyols in slab and molded polyurethane foam applications.

A comparison of gel permeation chromatograms of base-catalyzed and DMC-catalyzed polyols discloses differences which have not heretofore been recognized as result-dependent in polyol performance. For example, as shown in Curve A of FIG. 1, a base-catalyzed polyol exhibits a significant "lead" portion of low molecular weight oligomers and polyoxypropylene monols prior to the main molecular weight peak. Past the peak, the weight percentage of higher molecular weight species falls off rapidly. In Curve B of FIG. 1, a similar chromatogram of a DMC-catalyzed polyol reveals a tightly centered peak with very little low molecular weight "lead" portion, but with a small portion of higher molecular weight species, which may be termed "high molecular weight tail". Due to the low concentration of the high molecular weight tail portion, generally less than 2–3 weight percent of the total, the polydispersity remains low. Both curves are idealized for purposes of illustration.

SUMMARY OF THE INVENTION

It has now been surprisingly discovered that DMC-catalyzed polyoxypropylene polyols which mimic the behavior of base-catalyzed analogs may be obtained if, during oxypropylation, small but effective amounts of ethylene oxide or other suitable alkylene oxide as defined herein, are copolymerized during the most substantial part of oxypropylation, resulting in a random copolymer polyol, preferably a random polyoxypropylene/polyoxyethylene copolymer polyol. Such polyols have been found suitable for use in both molded and slab foam applications, and display processing latitude similar to their base-catalyzed analogs.

DETAILED DESCRIPTION OF THE INVENTION

Figure 1:
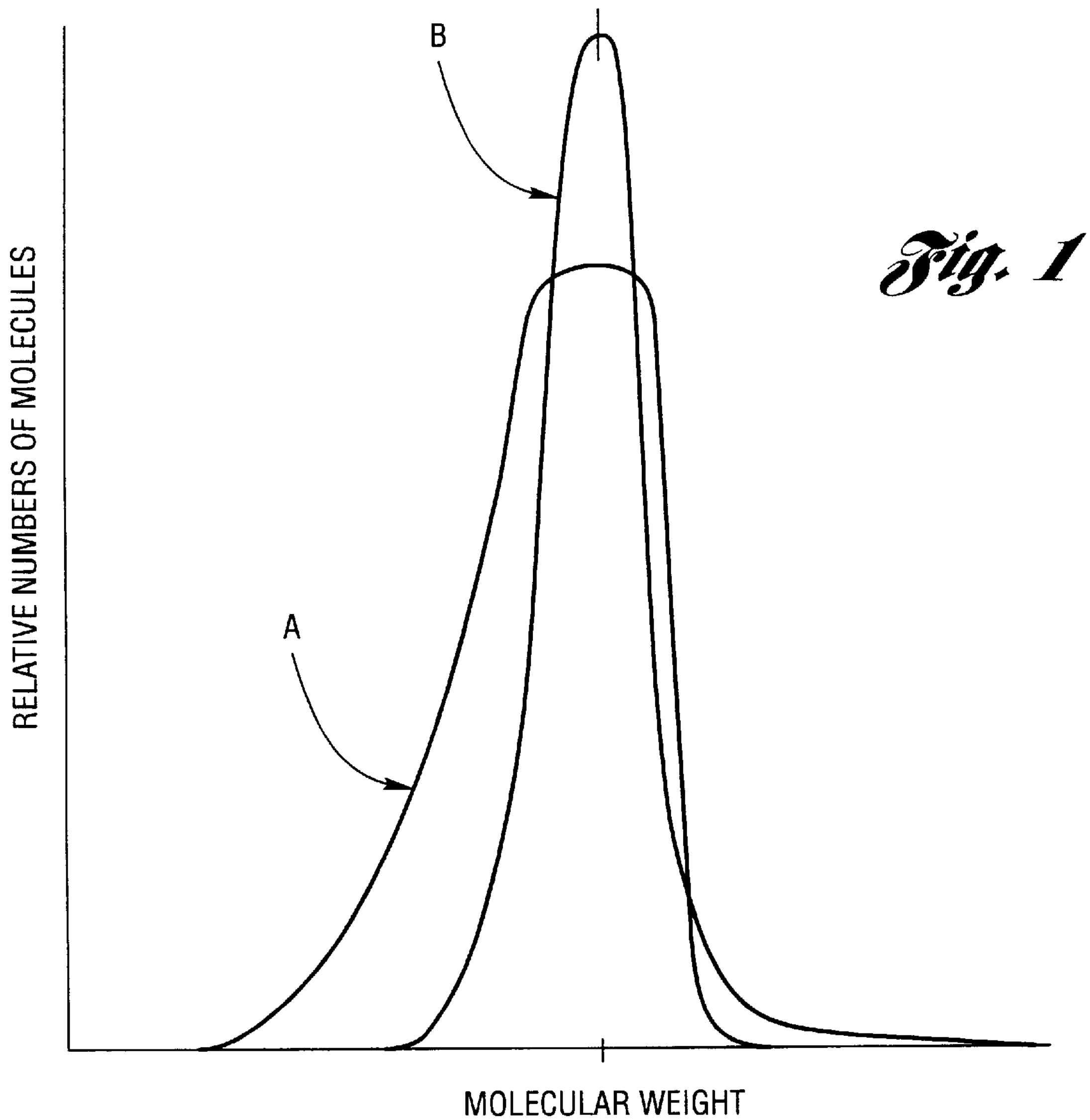
FIG. 1 illustrates hypothetical molecular weight distribution curves for a conventional, base-catalyzed polyol (Curve A) and a DMC-catalyzed polyol (Curve B).

Intensive research has revealed that the higher molecular weight species unavoidably obtained during DMC-catalyzed oxypropylation, despite their low concentration, are largely responsible for the abnormal behavior of DMC-catalyzed polyols in urethane molded and slab foam applications. It is surmised that these high molecular weight species exert a surfactant-like effect which alters the solubility and hence the phase-out of the growing polyurethane polymers during the isocyanatepolyol reaction.

Thus far, no completely effective methods of avoiding production of high molecular weight components during polyoxypropylation employing DMC catalysts have been found. The present inventors have surmised that the dissimilar processability of conventional polyols and DMC-catalyzed polyols may reside in the differences exhibited by these polyols with respect to their content of lower and higher molecular weight species. Since the complex phase-out of hard and soft segments which occurs during polyurethane polymerization is known to be affected by polyol molecular weight, this phase-out was one aspect which was identified as a possible cause of processability differences. It has been surprisingly discovered that preparation of polyoxypropylene polyols from mixtures containing a minimum effective amount of copolymerizable monomers, preferably ethylene oxide, throughout the substantial majority of DMC-catalyzed oxyalkylation, produces polyols which are useful in the same manner as their base-catalyzed polyoxypropylene counterparts in molded and slab foam applications while maintaining molecular weight distribution substantially the same as DMC-catalyzed, homopolymeric polyoxypropylene polyols. It is hypothesized that the incorporation of ethylene oxide alters the compatibility of the high molecular weight fractions of the subject polyols during polyurethane polymerization, thus changing also the phase-out of hard and soft segments.

It is most surprising that foam collapse in DMC-catalyzed polyol-based slab foam formulations (destabilization) is experienced, while at the same time, tightness (excessive stabilization) is experienced in molded foam. The inventors have surprisingly found that the incorporation of the previously discussed random internal ethylene oxide in DMC-catalyzed polyoxypropylene polyols cures both excessive tightness in molded foam as well as foam collapse in slab foam. That these very different processing difficulties can be cured by the same solution is most surprising.

Even though excessive foam tightness and foam collapse may be avoided by the preparation of DMC-catalyzed polyoxypropylene polyols as defined herein, the amount of high molecular weight tail is not believed to be significantly altered, and thus the unexpected and meritorious effects exhibited by copolymerized products must be due to some other cause. It is believed that the high molecular weight species generated are also copolymers, and that the presence of the more hydrophilic oxyethylene moieties, or of stereochemically different moieties such as butylene oxides, etc., in these fractions alters the compatibility of these species with the hard and soft segments of the growing polymer chains during polyurethane polymerization. The mechanism for this change is not known. It may result, for example, from a change in the hydrophile/lipophile balance (HLB) of the high molecular weight fractions, may create the polyether equivalent of polyurethane hard and soft segments, or may alter the crystallinity or stereoregularity, which in any case, may be defined as a change in "surfactancy" of the high molecular weight tail, since the effects are believed to be surface-related.

It has been found that the minimum amount of ethylene oxide or other copolymerizable monomer copolymerized with propylene oxide must be about 1.5 weight percent relative to the total monomer feed. For example, amounts of 1 weight percent or less of ethylene oxide exhibit substantially the same properties as DMC-catalyzed homopolyoxypropylene polyols. Monomers other than ethylene oxide which may be used to achieve the meritorious effects of the subject invention include those monomers copolymerizable with propylene oxide or copolymerizable with mixtures of propylene oxide and ethylene oxide under DMC catalysis.

Such monomers include, but are not limited to, 1,2-butylene oxide, 2,3-butylene oxide, oxetane, 3-methyloxetane, caprolactone, maleic anhydride, phthalic anhydride, halogenated propylene and butylene oxides, and α-olefin oxides. The effective amounts of such monomers in preparation of polyols which are suitable for use in slab foam may be readily ascertained by synthesis of a target polyol and evaluation of its performance in the supercritical foam test, as hereinafter described. In general, the amounts employed will be similar to the amounts of ethylene oxide employed, on a mole-to-mole basis. However, copolymermizable monomers which cause greater alteration of the polyol structure of the high molecular weight fractions can be used in lesser amounts. Mixtures of such monomers are also useful, particularly in conjunction with ethylene oxide. Such monomers are referred to herein as stabilization-modifying comonomers. While ethylene oxide is used in the discussions which follow, these discussions apply as well to stabilization-modifying comonomers, unless indicated otherwise.

The maximum amount of ethylene oxide which can be successfully utilized depends upon the end use contemplated. As the amount of ethylene oxide increases, the polyol becomes increasingly hydrophilic, and the primary hydroxyl content rises. When amounts in excess of 10 weight percent ethylene oxide are contained in the outermost portion of the polyol, the resulting polyols are significantly less processable on free rise foam machines. Higher levels of primary hydroxyl content are possible when ethylene oxide (EO) capped polyols are to be subsequently prepared, or when a high EO/PO ratio is to be used in the final stage of polymerization, for example to purposefully increase primary hydroxyl content for use in one-shot molded foam and high resilience slab foam. In such cases, larger amounts of internal oxyethylene moieties, e.g. up to 15–20 weight percent of the total feed, may be used. However, when low primary hydroxyl content, polyoxypropylene homopolymer mimics are contemplated, the total oxyethylene content should be less than 10 weight percent, more preferably less than 9 weight percent, yet more preferably less than 8 weight percent, and most preferably in the range of about 2 weight percent to about 7 weight percent. When a copolymerizable monomer other than ethylene oxide is utilized in conjunction with ethylene oxide, the polyol may contain amounts of ethylene oxide substantially greater than 8–10%.

Thus, the polyols of the subject invention are substantially polyoxypropylene polyols containing minimally about 1.5 weight percent oxyethylene or other stabilization-modifying comonomer moieties, these polyols produced in such a fashion that not more than 5% of the total oxypropylation is conducted with propylene oxide alone. These polyols may be termed "spread EO polyols", as oxyethylene moieties, the preferred comonomers, are "spread", or randomly distributed throughout the portion of the polyol prepared by DMC-catalyzed oxyalkylation. The polyols of the subject invention further include capped spread EO polyols which have been capped with an alkylene oxide or mixture of alkylene oxides in the presence of a capping-effective catalyst, or a non-DMC catalyst in the case of polyoxypropylene caps. The spread EO polyols and capped spread EO polyols also include such polyols prepared, as described hereinafter, by additionally oxyalkylating, in the presence of a DMC catalyst, a polyoxypropylene oligomer prepared by oxyalkylation employing a non-DMC catalyst.

Surprisingly, it is not the total oxyethylene content which is most important. Rather, it is important that the most substantial part of the polyoxyalkylation taking place in the presence of DMC catalysts be conducted in the presence of ethylene oxide. While the ethylene oxide feed to the polyoxyalkylation reactor may be occasionally interrupted, ethylene oxide will still be present in minor but decreasing amounts during such interruption. By the term "most substantial part" in this regard is meant that ethylene oxide will be absent, i.e. will have a concentration in the polyoxyalkylation reactor of 0 weight percent, during not more than 5% of the total oxyalkylation period when propylene oxide is fed to the reactor during DMC catalysis, preferably not more than 3% of this period, and in particular not more than 1% of this period. Thus, at least 95% of the polyoxyalkylene portion of the resulting polyol will contain randomly distributed oxyethylene moieties, with the minimum total oxyethylene content being about 1.5 weight percent. Any homopolyoxypropylene "cap" will thus also constitute less than 5% by weight of the copolymer, preferably less than 3%, and most preferably, 1% or less.

The ethylene oxide content of the feed may be cycled from 0 to higher values during oxyalkylation. Such cycling down to zero for brief intervals, even though repeated, will not defeat the object of the invention, as the ethylene oxide content in the reactor will remain finite despite the ethylene oxide feed being zero for a brief time. In assessing the scope of the claims, it is the principle of the invention which should be stressed, i.e. minimization of periods of oxyalkylation with substantially all propylene oxide.

The oxyalkylation periods discussed above reflect only the portion of oxyalkylation performed in the presence of DMC catalysts, and preferably include the activation period (induction period) as well, where the DMC catalyst is being activated. Generally, DMC catalysts exhibit an initial induction period where the rate of oxyalkylation is small or zero. This is most evident in batch-type processes, where following addition of catalyst to the initiator(s), alkylene oxide is added to pressurize the reactor and the pressure monitored. The induction period is considered over when the propylene oxide pressure drops. This pressure drop is often rather rapid, and the activated catalyst then exhibits a high oxyalkylation rate. Ethylene oxide or other modifying copolymer is preferably present during the induction period as well. However, the induction period is not taken into account when determining the portion of DMC-catalyzed oxyalkylation during which the presence of ethylene oxide is required.

It is sometimes necessary to produce capped polyoxyalkylene polyols. With base-catalyzed polyols, capping is generally performed by ceasing the feed of propylene oxide or propylene oxide/ethylene oxide mixtures and continuing with ethylene oxide only. This procedure produces polyols with a polyoxyethylene cap, resulting in a high primary hydroxyl content which increases polyol reactivity. For some base-catalyzed copolymer polyols, a "finish" with all propylene oxide may be used to produce polyols with high secondary hydroxyl content, i.e. a primary hydroxyl content less than about 3 mol percent. With DMC-catalyzed polyols, capping may be performed to produce polyols with both lower as well as higher primary hydroxyl content, but ethylene oxide capping may generally not be performed using DMC catalysts. While the latter catalysts may be used to prepare a polyoxypropylene cap, this cap must be less than 5 weight percent, and is preferably absent when the cap is prepared using DMC catalysts. When more than a 5 weight percent DMC-catalyzed polyoxypropylene cap is employed, the polyols are unsuitable in molded and slab form formulations, causing foam collapse. If the primary hydroxyl content of DMC-catalyzed polyols is desired to be lowered, capping with propylene oxide may be performed with a non-DMC catalyst, for example a traditional basic catalyst such as potassium hydroxide, or a catalyst such as calcium naphthenate.

In general, however, an increase in the primary hydroxyl content may be desired. In such cases, a polyoxyethylene cap may be prepared by oxyethylating in the presence of a catalyst which is effective in capping but does not generate large quantities of substantially homopolymeric polyoxyethylene polymers. At the present time, non-DMC catalysts must be used for this purpose. DMC-catalyzed oxyethylation has thus far been impractical, as oxyalkylation with ethylene oxide alone or with alkylene oxide mixtures containing more than about 70 weight percent ethylene oxide generally results in the formation of significant amounts of ill-defined polymers believed to be substantially homopolymeric or near-homopolymeric polyoxyethylene glycols, as indicated previously. By the term “capping-effective catalyst” is meant a catalyst which efficiently caps the DMC-catalyzed polyol without production of significant amounts of polyoxyethylene glycols and/or other polyoxyethylene polymers. With respect to propylene oxide, a “capping-effective” catalyst is one which allows oxyalkylation with propylene oxide without generation of high molecular weight tail. Basic catalysts such as NaOH, KOH, barium and strontium hydroxides and oxides, and amine catalysts are suitable as “capping-effective” catalysts, for example. It is most surprising that even polyols with high polyoxyethylene caps still exhibit processability difficulties unless the base polyol contains random internal oxyethylene moieties.

To cap a DMC-catalyzed polyol with either propylene oxide or ethylene oxide, the DMC catalyst must first be removed, destroyed, or inactivated. This is most conveniently done by adding ammonia, an organic amine, or preferably an alkali metal hydroxide. When the latter, e.g. KOH, is added in excess, the catalytic activity of the DMC catalyst is destroyed, and the excess KOH serves as a conventional base catalyst for capping. A “capped polyol” as that term is used herein is inclusive of DMC-catalyzed polyols which are further oxyalkylated in the presence of a non-DMC catalyst or a “capping-effective” catalyst. This term does not include DMC-catalyzed PO/EO random copolymers which are subsequently reacted with all propylene oxide in the presence of a DMC catalyst; such polyols must meet the limitation disclosed earlier that the total cap not include more than 5% of solely polyoxypropylation, most preferably not more than 1%.

While the spread EO polyols thus far described are suitable for slab foam and for some molded foam formulations, many of the latter may conveniently utilize a higher oxyethylene content, i.e. a random, internal oxyethylene content in the range of 12 weight percent to about 35 weight percent, preferably 15 to 35 weight percent, exclusive of any cap prepared by oxyalkylating with a major amount of ethylene oxide. Capped polyols containing the internal blocks previously described and then polyoxyethylene capped with mixtures containing in excess of 70 weight percent ethylene oxide, and most preferably in excess of 80–90 weight percent ethylene oxide in the presence of a non-DMC catalyst are highly useful.

Synthesis of the spread EO polyols and capped spread EO polyols may be accomplished using the catalysts and by the methods generally set forth in U.S. Pat. Nos. 5,470,812, 5,482,908, 5,545,601, and 5,689,012 and copending application Ser. No. 08/597,781, herein incorporated by reference. In general, any DMC catalyst may be used for the oxyalkylation catalyst, including those disclosed in the foregoing U.S. Pat. Nos. and patent applications and in addition U.S. Pat. Nos. 5,100,997, 5,158,922, and 4,472,560. Activation of the DMC catalysts is performed by addition of propylene oxide, as disclosed, preferably with minor amounts of ethylene oxide or other stabilization modifying copolymerizable monomer.

In conventional batch processing, DMC catalyst is introduced into the reactor together with the desired quantity of initiator, which is generally an oligomer having an equivalent weight in the range of 200 to 700 Da. Significant quantities of monomeric starters such as propylene glycol and glycerine tend to delay catalyst activation and may prevent activation altogether, or may deactivate the catalyst as the reaction proceeds. The oligomeric starter may be prepared by base-catalyzed oxypropylation, or by DMC catalysis. In the latter case, all but the induction period should be conducted in the presence of about 1.5 weight percent or more of ethylene oxide. The induction period during which catalyst is activated preferably includes ethylene oxide as well.

The reactor is heated, for example to 110° C., and propylene oxide, or a mixture of propylene oxide containing a minor amount of ethylene oxide is added to pressurize the reactor, generally to about 10 psig. A rapid decrease in pressure indicates that the induction period is over, and the catalyst is active. A mixed feed of propylene oxide and ethylene oxide is then added until the desired molecular weight is obtained. The PO/EO ratio may be changed during the reaction, if desired.

In the conventional continuous process, a previously activated starter/catalyst mixture is continuously fed into a continuous reactor such as a continuously stirred tank reactor (CSTR) or tubular reactor. The same catalyst/initiator constraints as described in the batch process apply. A cofeed of propylene oxide and ethylene oxide is introduced into the reactor, and product continuously removed.

In the continuous addition of starter process, either batch operation or continuous operation may be practiced. In the batch process, catalyst and DMC catalyst are activated as in the conventional batch process. However, a smaller molar amount of oligomeric initiator relative to the moles of product is used. The molar deficiency of starter is supplied gradually, preferably in the PO/EO feed, as low molecular weight starter such as propylene glycol, dipropylene glycol, glycerine, etc.

In the continuous, continuous addition of starter process, the initial activation is performed as with the conventional batch process, or as in the conventional continuous process employing preactivated starter. However, following activation, continuous addition of monomeric starter accompanies PO/EO feed. Product takeoff is continuous. Preferably, a takeoff stream from the reactor is used to activate further DMC catalyst. In this manner, following initial line out, products may be obtained which are entirely composed of random PO/EO, with EO spread throughout the molecule.

The starter molecules useful to prepare spread EO polyols are dependent upon the nature of the process. In batch processes, oligomeric starters are preferred. These include homopolymeric and heteropolymeric PO/EO polyols prepared by base catalysis, preferably having equivalent weights in the range of 200 Da to 700 Da, or DMC-catalyzed PO/EO copolymer polyols which have been prepared using cofed propylene oxide and ethylene oxide for the most substantial part of the oxyalkylation other than the induction period. It should be noted that molecular weights and equivalent weights in Da (Daltons) are number average molecular and equivalent weights unless indicated otherwise.

In the continuous addition of starter processes, both batch and continuous, the starter may be the same as those previously described; may be a lower molecular weight oligomer; a monomeric initiator molecule such as, in a non-limiting sense propylene glycol, dipropylene glycol, glycerine, sorbitol, or mixtures of such monomeric initiators; or may comprise a mixture of monomeric and oligomeric initiators, optionally in conjunction with a recycle stream from the process itself, this recycle stream containing polyols of target weight, or preferably polyols which are oligomeric relative to the target weight. Unlike batch processes, in continuous addition of starter processes, the initiator feed may comprise a minor portion, i.e. less than 20 mol percent of total initiator molecules, and preferably less than 10 mol percent, of DMC-catalyzed oligomeric starters which are homopolymeric polyoxypropylene oligomeric polyols. Further, details regarding spread EO polyol preparation may be had by reference to the actual examples presented herein.

The polyols of the subject invention have functionalities, molecular weights and hydroxyl numbers suitable for use in molded and slab foams. Nominal functionalities range generally from 2 to 8. In general, the average functionality of polyol blends ranges from about 2.5 to 4.0. The polyol equivalent weights generally range from somewhat lower than 1000 Da to about 5000 Da when the unsaturation of the polyol is below 0.02 meq/g. Unsaturation is preferably 0.015 meq/g or lower, and more preferably in the range of 0.002 to about 0.008 meq/g. Hydroxyl numbers may range from 10 to about 60, with hydroxyl numbers in the range of 24 to 56 being more preferred. Blends may, of course, contain polyols of both lower and higher functionality, equivalent weight, and hydroxyl number. Any blend should preferably not contain more than 20 weight percent of non-spread EO polyols, for example DMC-catalyzed homopolymeric polyoxypropylene polyols or DMC-catalyzedpolyoxypropylene/polyoxyethylene copolymer polyols having more than a 5 weight percent internal all-oxypropylene block or a 5 weight percent DMC-catalyzed polyoxypropylene cap.

The performance of spread EO polyols and capped spread EO polyols destined for slab foam formulations may be assessed by testing these polyols in the "Supercritical Foam Test" (SCFT), a test expressly designed to magnify differences in polyol behavior. Polyols which pass this test have been found to perform well in commercial applications, without foam collapse. In contrast, when polyols are tested with conventional formulations, bench tests frequently fail to indicate any difference between polyols, whereas in commercial production, such differences are readily apparent.

In the SCFT, a foam prepared from a given polyol is reported as "settled" if the foam surface appears convex after blow-off and is reported as collapsed if the foam surface is concave after blow-off. The amount of collapse can be reported in a relatively quantitative manner by calculating the percentage change in a cross-sectional area taken across the foam. The foam formulation is as follows: polyol, 100 parts; water, 6.5 parts; methylene chloride, 15 parts; Niax® A-1 amine-type catalyst, 0.10 parts; T-9 tin catalyst, 0.34 parts; L-550 silicone surfactant, 0.5 parts. The foam is reacted with a mixture of 80/20 2,4- and 2,6-toluene diisocyanate at an index of 110. The foam may be conveniently poured into a standard 1 cubic foot cake box, or a standard 1 gallon ice cream container. In this formulation, conventionally prepared, i.e. base catalyzed polyols cause the foam to settle approximately 15%±3%, whereas polyols prepared from DMC catalysts having homopolyoxypropylene blocks in excess of 5 weight percent of total polyol weight cause the foam to collapse by approximately 35–70%. Subject invention polyols with no homopolyoxypropylene blocks behave substantially similarly to KOH-catalyzed polyols.

Having generally described this invention, a further understanding can be obtained by reference to certain specific examples which are provided herein for purposes of illustration only and are not intended to be limiting unless otherwise specified.

EXAMPLES 1–5 AND COMPARATIVE EXAMPLES C1–C3

These examples illustrate the significant and surprising differences between base-catalyzed, DMC-catalyzed homopolyoxypropylene polyols, and spread EO polyols. The base-catalyzed polyol is ARCOL® 5603, a 56 hydroxyl number, glycerine-initiated homopolymeric polyoxypropylene polyol whose preparation was conventionally catalyzed using KOH. The relatively low equivalent weight resulted in a monol content of c.a. 8.2 mol percent, and an actual functionality of 2.83. The DMC-catalyzed polyols were prepared from initiators containing glycerine and propylene glycol in order to obtain actual functionalities close to the actual functionality of the base-catalyzed control, so as to render the comparisons of polyol processing as accurate as possible. Both batch and continuous addition of starter processes were employed in making the DMC-catalyzed polyols, the latter process indicated in Table 1 as "continuous". The polyols were employed in the SCFT previously described and compared to the control in terms of percent settle. Since the SCFT is sensitive to ambient conditions, control foams were run on the same day. The data is summarized in Table 1.

TABLE 1

| | Example:[1] | | | | | | | | | |
|---|---|---|---|---|---|---|---|---|---|---|
| | C1 | C2 | C3 | C4 | C5 | 1 | 2 | 3 | 4 | 5 |
| Polyol Type | KOH Catalyzed | DMC Batch | DMC Continuous | DMC Batch | DMC Batch | DMC Batch | DMC Continuous | DMC Batch | DMC Batch | DMC Continuous |
| % Spread EO | 0 | 0 | 0 | 0.5 | 1.0 | 1.75 | 2.4 | 5.0 | 6.0 | 6.4 |
| Hydroxyl No. | 57.5 | 56.6 | 56.5 | 56[4] | 56[4] | 56.5 | 56.3 | 56[4] | 56[4] | 56[4] |
| Unsaturation (meq/g) | 0.029 | 0.005 | 0.005 | 0.005 | 0.005 | 0.005 | 0.005 | 0.005 | 0.005 | 0.005 |
| Functionality | 2.83 | 2.78 | 2.87 | NA | NA | 2.76 | 2.88 | NA | NA | NA |
| SCFT (% Settle)[2] | 15 ± 3% | 32% | 36% | 43% | 40% | 19% | 12% | 20% | 14% | 15% |

[1]Examples with a preceding "C", e.g. "C1" are Comparative Examples.
[2]KOH-catalyzed controls repeatedly provide settle of 15 ± 3%.
[3]NA = not available.
[4]Nominal OH #.

The foregoing Examples and Comparative Examples illustrate both the importance of preparing polyoxyalkylene polyols containing spread EO as well as the criticality of the minimum amount required to produce a polyol suitable for foam production without collapse In Comparative Example C1, the KOH-catalyzed polyol performed well in the SCFT, with a settle of 13%. Polyols exhibiting no more than 15–20% settle have been found to run flawlessly in full scale trials. Foams exhibiting settle greater than 35% almost always experience collapse. Foams with SCFT settle greater than 25% are not suitable for low density foam, but may be suitable for some higher density applications.

Comparative Examples C2 and C3 are batch and continuous DMC-catalyzed polyols prepared analogously to the Comparative Example C1 polyol, i.e. from all propylene oxide. These foams exhibited considerable settle, 32% and 36%, some three times higher than the control KOH-catalyzed polyol. In Comparative Examples C4 and C5, DMC-catalyzed batch polyols, very small amounts of ethylene oxide, 0.5% and 1.0% by weight were cofed with propylene oxide, generating random copolymers. However, foams prepared from these polyols also exhibited severe settle, even more, at 43% and 40% respectively, than the all propylene oxide, DMC-catalyzed polyols of Comparative Examples C2 and C3.

In Example 1, however, a DMC-catalyzed batch polyol containing 1.75 weight percent copolymerized ethylene oxide yielded foams with a degree of settle virtually the same as the KOH-catalyzed control. Similar excellent performance was achieved at 2.4 to 6.4 weight percent in the DMC-catalyzed polyols of Examples 2–5.

COMPARATIVE EXAMPLES C6 AND C7

Further foam trials of KOH-catalyzed and DMC-catalyzed polyols were made. The KOH polyol in this case (Comparative Example C6) is a 56 hydroxyl number, polyoxypropylene-capped polyoxypropylene/polyoxyethylene copolymer polyol. The commercial polyol is prepared by oxyalkylating glycerine with a mixture of propylene oxide containing sufficient ethylene oxide to provide an oxyethylene content of 8.5 weight percent, using KOH as the basic catalyst. The PO/EO cofeed is then terminated and replaced with a PO-only feed to cap the polyol with a polyoxypropylene block to reduce the primary hydroxyl content to less than 3%. Attempts to produce a DMC-catalyzed analog (Comparative Example C7) suitable for use in polyurethane foam production failed.

TABLE 2

| | Example | |
|---|---|---|
| | C6 | C7 |
| Polyol Type | KOH Catalyzed | DMC Batch |
| % Random EO | 8.5 | 8.5 |
| PO Cap, % | 6.5 | 6.5 |
| Hydroxyl No. | 56 | 56 |
| Unsaturation (meq/g) | 0.037 | 0.005 |
| Functionality | 2.79 | NA[1] |
| SCFT (% Settle) | 11% | 40% |

[1]Estimated at 2.80 ± 0.08.

The results presented in Table 2 indicate that while KOH-catalyzed, propylene oxide-capped polyoxypropylene/polyoxyethylene random copolymer polyols perform well in foaming tests, their DMC-catalyzed analogs exhibit very high degrees of settle. The preparation of a 6.5 weight percent homopolyoxypropylene cap requires oxypropylation without ethylene oxide copolymerization for an excessive period, i.e. more than 5% by weight of total oxyalkylation.

COMPARATIVE EXAMPLES C8–C9

Molded foams were prepared from formulations containing 75 parts base polyol, 25 parts ARCOL® E849 polyol, 1.5 parts diethanolamine, 0.1 parts NIAX® A-1 catalyst, 0.3 parts NIAX A-33 catalyst, and 1.0 part DC5043 silicone surfactant, reacted with TDI at 100 index, with 4.25 parts water as blowing agent. Vent collapse was measured from a similar formulation but with 20% solids. Two polyols were employed as the base polyol. In Comparative Example C8, the base polyol is a conventionally base-catalyzed, 28 hydroxyl number polyoxypropylene triol with a 15% oxyethylene cap to provide high primary hydroxyl content. In Comparative Example C9, the base polyol is a 28 hydroxyl number DMC-catalyzed polyoxypropylene triol capped with ethylene oxide using KOH catalysis. The polyol contains no internal oxyethylene moieties. The results of the one-shot molded foam tests are presented below in Table 3.

TABLE 3

| | Example | |
|---|---|---|
| | C8 | C9 |
| Polyol Type | KOH Catalyzed | DMC Catalyzed |
| Force to Crush[1] | 312/92/56 | 107/43/34 |
| Vent Collapse | 19.1 | Total |

The results above illustrate that EO-capped polyols exhibit foaming problems as do their non-capped analogs. The base-catalyzed polyol exhibited typical foam characteristics. However, the DMC-catalyzed polyol (Comparative Example C9) exhibited total vent collapse. The force to crush for the DMC-catalyzed polyol is very low, usually a desirable characteristic. However, this low value is due to the exceptionally large cells, with cell sizes on the order of 4–6 mm, far larger than the relatively fine-celled KOH-catalyzed polyol-derived foam.

EXAMPLE 6 AND COMPARATIVE EXAMPLES C10 and C11

A series of free-rise foams were prepared using ARCOL® E785 polyol, a 28 hydroxyl, EO-capped polyol, as the control (Comparative Example C10). Tested against this control were a 25 hydroxyl number DMC-catalyzed analog containing no internal EO but a similar EO cap (Comparative Example C11), and a 28 hydroxyl number polyol of the subject invention, containing 5% random internal EO and a KOH-catalyzed 15% EO cap (Example 6). The results are presented in Table 4. Foam densities are 2.90±0.04 pounds/ft$^3$.

TABLE 4

| | Example | | |
|---|---|---|---|
| | C10 | C11 | 6 |
| Polyol Type | KOH Catalyzed | DMC Catalyzed | DMC Catalyzed |
| OH Number | 28 | 25 | 28 |
| EO Content (internal/cap) | 0/15 | 0/15 | 5/15 |
| Foam Resiliency | 71 | 58 | 71 |
| Air Flow | 2.95 | 0.55 | 1.83 |
| Foam Height | 8.75 | 7.0 (settle) | 8.75 (Some shrinkage) |
| Cell Appearance | Normal | Very Coarse | Normal |
| Tensile Strength | 21.86 | 12.97 | 18.5 |

As can be seen from the foregoing, the DMC-catalyzed capped polyol having no internal EO (spread EO) produced a coarse-celled foam with considerable collapse, poor air flow (excessive foam tightness), low resiliency, and low tensile strength as compared to the base-catalyzed control. By including 5 weight percent random EO into the polyol prior to capping, foam height is substantially maintained with only minor shrinkage and identical resilience, with fine cells. Tensile strength and air flow were only moderately lower than the KOH-catalyzed control.

By the terms "improved processing latitude" and "processing latitude-increasing" and like terms is meant that the polyol in-question exhibits performance in the supercritical foam test superior to that exhibited by a DMC-catalyzed, homopolyoxypropylene analog, with a percent settle of less than 35%, preferably less than 25%, and most preferably has the same or lesser degree of settle as a comparative base-catalyzed polyol, or exhibits improved crushability and/or freedom from vent collapse, in the case of molded foam. Most preferably, such polyols also exhibit foam porosity, as measured by air flow, of about the same order as a comparative KOH-catalyzed foam. By the term "system" is meant a reactive polyurethane-producing formulation. By the term "intrinsic unsaturation" is meant the unsaturation produced during oxyalkylation, exclusive of any unsaturation added purposefully by copolymerizing unsaturated copolymerizable monomers or by reacting a polyol with an unsaturated copolymerizable monomer reactive therewith, these latter termed "induced unsaturation".

The polyols of the subject invention can be used to prepare polymer polyols which do not contribute to foam collapse or to excessive foam stabilization. Such polymer polyols are prepared by the in situ polymerization of one or more vinyl monomers in a base polyol which is a polyol of the subject invention. The in situ vinyl polymerization is a well known process, and may, for example, employ preformed stabilizers or stabilizer precursors. Preferred vinyl monomers are styrene, acrylonitrile, methylmethacrylate, vinylidine chloride, and the like. Solids contents as prepared preferably range from 30 weight percent to 50 weight percent or higher.

By the terms "major" and "minor" if used herein is meant 50% or more and less than 50%, respectively, unless indicated otherwise. The terms "initiator" and "starter" are used herein interchangeably and have the same meaning unless otherwise specified. By the terms "a"or "an" in the claims herein is meant one or more unless the language indicates the contrary. Any embodiment described or claimed herein can be used to the exclusion of any embodiment or feature not disclosed and/or claimed, provided that the features necessary to the invention are present. Necessary features of the invention include conducting oxypropylation in the presence of ethylene oxide or stabilization modifying monomer for minimally 95% of DMC-catalyzed oxyalkylation; a minimum oxyethylene or stabilization modifying monomer content of 1.5 weight percent relative to the weight of the polyol exclusive of any cap added in the presence of a capping-effective catalyst with respect to polyoxyethylene caps and a non-DMC catalyst with respect to polyoxypropylene caps; and not more than 5 weight percent of a polyoxypropylene cap prepared in the presence of a DMC catalyst. Molecular weights and equivalent weights herein are number average molecular and equivalent weights in Daltons (Da) unless indicated otherwise.

Having now fully described the invention, it will be apparent to one of ordinary skill in the art that many changes and modifications can be made thereto without departing from the spirit or scope of the invention as set forth herein.

What is claimed is:

1. In a process for the preparation of a polyurethane slab or molded foam by the reaction of a di- or polyisocyanate with a polyether polyol in the presence of blowing agent(s), catalyst(s), chain extender(s), crosslinker(s), surfactant(s), additives and auxiliaries, the improvement comprising:

selecting as at least a portion of said polyol component a processing latitude-increasing DMC-catalyzed, spread EO polyoxypropylene polyol having a nominal functionality of 2 or more, a random oxyethylene content of about 1.5 weight percent to less than 10 weight percent, wherein not more than 5 weight percent of the total DMC-catalyzed oxyalkylation period used in preparing said spread EO polyoxypropylene polyol is conducted in the absence of ethylene oxide.

2. The process of claim 1 wherein said spread EO polyoxypropylene polyol has an oxyethylene content in the range of 2 weight percent to 8 weight percent.

3. The process of claim 1 wherein said spread EO polyoxypropylene polyol exhibits a settle of less than about 25% in the supercritical foam test.

4. A process for the preparation of a DMC-catalyzed polyoxypropylene polyol having increased processing latitude when used in polyurethane molded and slab foam systems, said process comprising:

a) supplying an activated DMC catalyst/initiator mixture to a reactor;

b) polyoxyalkylating said initiator with an alkylene oxide mixture containing propylene oxide and ethylene oxide such that the polyol contains about 1.5 weight percent to less than 10 weight percent of random oxyethylene moieties, and the concentration of ethylene oxide during DMC-catalyzed oxyalkylation is above zero for minimally 95% of the total oxyalkylation;

c) recovering a spread EO polyoxypropylene polyol.

5. The process of claim 4 wherein said spread EO polyoxypropylene polyol exhibits a settle of less than about 35%.

6. The process of claim 4 wherein the concentration of ethylene oxide in the alkylene oxide feed is maintained at a level of 0.5 weight percent or greater during the oxyalkylation.

7. The process of claim 4 wherein said spread EO polyol is polyoxypropylene capped, said polyoxypropylene cap constituting no more than 5 weight percent of said spread EO polyoxyalkylene polyol when capping of said spread EO polyol with propylene oxide is conducted in the presence of a DMC catalyst.

8. The process of claim 4 wherein the weight percent of oxyethylene moieties is about 2 weight percent to 8 weight percent.

9. The process of claim 8 wherein the weight percent of oxyethylene moieties is between 2 weight percent and 7 weight percent.

10. The process of claim 4 wherein said process is a continuous process wherein additional initiator molecules are continually or incrementally added to said reactor.

11. The process of claim 10 wherein said additional initiator molecules have an equivalent weight of 100 Da or less.

12. The process of claim 10 wherein said additional initiator molecules have the same functionality as the initiator molecules in said DMC catalyst/initiator mixture.

13. A DMC-catalyzed polyoxypropylene polyol which exhibits broad processing latitude in polyurethane molded and slabstock foam formulations, said polyol prepared by the oxyalkylation of an initiator molecule or mixture thereof having two or more oxyalkylatable hydrogen atoms, said oxyalkylation performed with a mixture of propylene oxide and ethylene oxide such that the concentration of ethylene oxide is about zero for no more than about 5% of the total DMC-catalyzed oxyalkylation, said polyol having an oxyethylene content of from 1.5 weight percent to less than 10 weight percent.

14. The polyol of claim 13 wherein said polyol has an oxyethylene content of between about 2 weight percent and 8 weight percent.

15. The polyol of claim 14 which exhibits a percent settle of about 35% or less.

16. The polyol of claim 13 wherein said polyol has an unsaturation of 0.010 meq/g or less.

17. A capped DMC-catalyzed polyoxypropylene polyol which exhibits broad processing latitude in polyurethane molded and slabstock foam formulations, said polyol comprising:

a) a first copolymeric internal block prepared by oxyalkylating one or more initiator molecules having two or more oxyalkylatable hydrogen atoms with a mixture of propylene oxide and ethylene oxide such that the ethylene oxide content is above zero for at least 95% of the oxyalkylation, the oxyethylene content of said first internal block ranging from 1.5 weight percent to about 20 weight percent; and b) at least a second, external block selected from the group consisting of i) a polyoxyalkylene block comprising oxyethylene moieties, oxypropylene moieties, or mixtures thereof, optionally including additional $C_4$–$C_{12}$ substituted and unsubstituted alkylene oxides or oxetane, with the proviso that when propylene oxide or mixtures of only propylene oxide and ethylene oxide containing less than 1.5 weight percent ethylene oxide are employed, polymerization of said polyoxyalkylene block is performed in the presence of a catalyst other than a DMC catalyst; and ii) a substantially all polyoxypropylene block polymerized in the presence of a DMC catalyst, said polyoxypropylene block ii) constituting no more than 5 weight percent of said capped DMC-catalyzed polyol.

18. The capped polyol of claim 17 wherein said external polyoxyalkylene block is a polyoxyethylene block prepared by polymerizing ethylene oxide onto said first internal block in the presence of a capping-effective catalyst.

19. The capped polyol of claim 17 wherein said first internal block contains from 2 weight percent to about 15 weight percent oxyethylene moieties.

20. The capped polyol of claim 17 wherein said first internal block contains from 2 weight percent to about 10 weight percent oxyethylene moieties.

21. The capped polyol of claim 17 wherein the catalyst employed during preparation of said external block comprises one or more of an alkali metal hydroxide, an alkaline earth metal oxide or hydroxide, a metal naphthenate, ammonia, or an organic amine.

22. The capped DMC-catalyzed polyoxypropylene polyol of claim 17 which exhibits a percent settle of less than about 35% in the supercritical foam test.

23. A DMC-catalyzed polyoxypropylene polyol suitable for producing molded high resilience molded foam with extended processing latitude, said polyol comprising the DMC-catalyzed oxyalkylation of one or more initiator molecules having an average functionality of 1.5 or greater with an oxyalkylation mixture comprising propylene oxide and ethylene oxide such that the ethylene oxide content of said oxyalkylation mixture is above zero for minimally 95% of the total DMC-catalyzed oxyalkylation, and wherein said polyol has a total oxyethylene content in the range of at least 12 weight percent to about 35 weight percent, and an equivalent weight of from about 800 Da to about 5000 Da.

24. The polyol of claim 23 wherein said total oxyethylene content is from about 15 weight percent to about 35 weight percent.

25. The polyol of claim 23 wherein said oxyalkylation mixture comprises minimally 1 weight percent ethylene oxide at all times.

26. The polyol of claim 23 further comprising a cap portion prepared by further oxyalkylating in the presence of a non-DMC catalyst.

27. The polyol of claim 26 wherein said further oxyalkylating takes place with a mixture containing about 50 weight percent or more of ethylene oxide.

28. The polyol of claim 26 wherein said further oxyalkylating takes place with a mixture containing minimally 70 weight percent ethylene oxide.

29. The polyol of claim 26 wherein said further oxyalkylating takes place with ethylene oxide.

30. A DMC-catalyzed polyoxypropylene polyol having good processing latitude when employed in slab or molded polyurethane foam systems, said polyol comprising the DMC-catalyzed oxyalkylation product prepared by oxyalkylating a starter molecule with an oxyalkylation mixture containing propylene oxide and an effective amount of a stabilization-modifying comonomer, said polyol having an intrinsic unsaturation of less than about 0.015 meq/g, an average functionality of from about 1.5 to about 8, and an equivalent weight from about 800 Da to about 5000 Da.

31. The DMC-catalyzed polyoxypropylene polyol of claim 30 which exhibits a percent settle of less than 35 percent in the supercritical foam test.

32. The polyol of claim 30 wherein said stabilization-modifying comonomer is selected from the group consisting of 1,2-butylene oxide, 2,3-butylene oxide, oxetane, methyloxetane, caprolactone, maleic anhydride, phthalic anhydride, $C_{5-20}$ α-olefin oxides, and halogenated alkylene oxides.

33. the polyol of claim 29 further comprising ethylene oxide as a termonomer in an amount of from about 1.5 weight percent to about 35 weight percent.

34. The polyol of claim 30 wherein at least one of ethylene oxide or said stabilization-modifying comonomer are present during at least 95% of said oxyalkylation.

35. A DMC-catalyzed base polyol-containing polymer polyol which does not contribute to excessive foam stabilization or foam collapse in polyurethane slab and molded foam, said polymer polyol prepared by the in situ polymerization of one or more vinyl monomers in a base polyol comprising the DMC-catalyzed oxyalkylation product prepared by oxyalkylating a starter molecule having an average functionality of from about 1.5 to about 8 with a mixture of propylene oxide containing an effective stabilization-modifying amount of ethylene oxide, a stabilization-modifying comonomer, or a mixture of ethylene oxide and a stabilization modifying comonomer, said stabilization modifying amount present during at least 95% of said oxyalkylation, said base polyol having an intrinsic unsaturation of less than about 0.015 meq/g, and an equivalent weight of about 800 Da to about 5000 Da.

36. The polymer polyol of claim 35 wherein said base polyol has an oxyethylene content of from about 1.5 weight percent to about 35 weight percent.

37. A DMC-catalyzed polyether polyol having broad processing latitude, said polyol comprising polyoxyethylene capped DMC-catalyzed polyoxypropylation product obtained by oxypropylating one or more initiator molecules having from 2 to about 8 oxyalkylatable hydrogen atoms with a mixture of propylene oxide containing on average 1.5 weight percent or more ethylene oxide such that not more than 5 weight percent of said DMC-catalyzed polyoxypropylation product is prepared while the content of ethylene oxide in said mixture of propylene oxide is about zero, said polyoxyethylene cap prepared by further oxyethylating said DMC-catalyzed polyoxypropylation product with ethylene oxide in the presence of a non-DMC polyoxyalkylation catalyst, to an equivalent weight of from about 500 Da to about 5000 Da and a primary hydroxyl content greater than 40 mol percent.

* * * * *